Dec. 31, 1957 W. S. EDWARDS 2,818,156

PALLET MOVING DEVICE

Filed Aug. 13, 1954 13 Sheets-Sheet 1

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 2

INVENTOR.
WILLIAM S. EDWARDS
BY
J. Warren Kinney, Jr.
ATTORNEY

PALLET MOVING DEVICE

Filed Aug. 13, 1954 13 Sheets-Sheet 3

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 4

INVENTOR.
WILLIAM S. EDWARDS
BY
J. Warren Kinney, Jr.
ATTORNEY

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 6

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 7

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 8

INVENTOR.
WILLIAM S. EDWARDS
BY
J. Warren Kinney, Jr.
ATTORNEY

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 10

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 11

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 12

INVENTOR.
WILLIAM S. EDWARDS
BY
J. Warren Kinney, Jr.
ATTORNEY

Dec. 31, 1957 W. S. EDWARDS 2,818,156

PALLET MOVING DEVICE

Filed Aug. 13, 1954 13 Sheets-Sheet 13

INVENTOR.
WILLIAM S. EDWARDS
BY
J. Warren Kinney, Jr.
ATTORNEY

United States Patent Office 2,818,156

Patented Dec. 31, 1957

2,818,156

PALLET MOVING DEVICE

William S. Edwards, Lockland, Ohio, assignor to The Coca-Cola Bottling Works Company, Cincinnati, Ohio, a corporation of Ohio Application August 13, 1954, Serial No. 449,666

7 Claims. (Cl. 198—21)

This invention relates to a pallet handling device.

An object of the invention is to provide a fully automatic pallet handling device for transferring loaded pallets from one level to another level.

Another object of the invention is to provide simple, fully automatic means for conveying pallets along one level to an elevator, of transferring the pallets onto the elevator, of moving the pallet to a different level, of removing the pallets from the elevator and of conveying the pallets away from the elevator on the latter level.

Still another object of the invention is to provide a pallet conveyor and elevator assembly with a plurality of actuating switches and safety devices which will effectively control operation of the device and which will automatically stop the device during those periods of time when pallets are being loaded onto or removed from the conveyors leading to and from the elevator.

A further object of the invention is to provide means in combination with the conveyor leading to the elevator for automatically engaging the opposite side edges of items stacked upon the pallets for disposing them in substantial vertical alignment prior to movement of the pallets onto the elevating mechanism.

A further object of the invention is to provide a conveyor and elevator mechanism for pallets wherein the elevating mechanism comprises a plurality of pallet-engaging shelves which are secured to and carried by endless members whereby the elevator structure requires a minimum of space.

Still a further object of the invention is to provide a pallet handling device which includes an elevator which is operated in but one direction for moving successive pallets from loading to unloading levels, thereby precluding the time loss heretofore encountered in elevating devices wherein the article-supporting platforms are mounted for reciprocating movement between loading and unloading levels.

Another object of the invention is to provide an elevator for a pallet handling device having the hereinabove described characteristics wherein the elevator may be simply yet accurately stopped each time at a predetermined level under varying loads.

Another object of the invention is to provide an endless type elevator with fully automatic means for guiding pairs of laterally spaced pallet supporting shelves from loading to unloading levels along parallel paths.

Still another object of the invention is to provide a pallet handling device with an elevator loading conveyor between a conveyor on the loading level and the elevator, and with an elevator unloader conveyor between a conveyor on the unloading level and the elevator.

These and other objects are attained by the means described herein and as disclosed in the accompanying drawings, in which.

Figure 1:
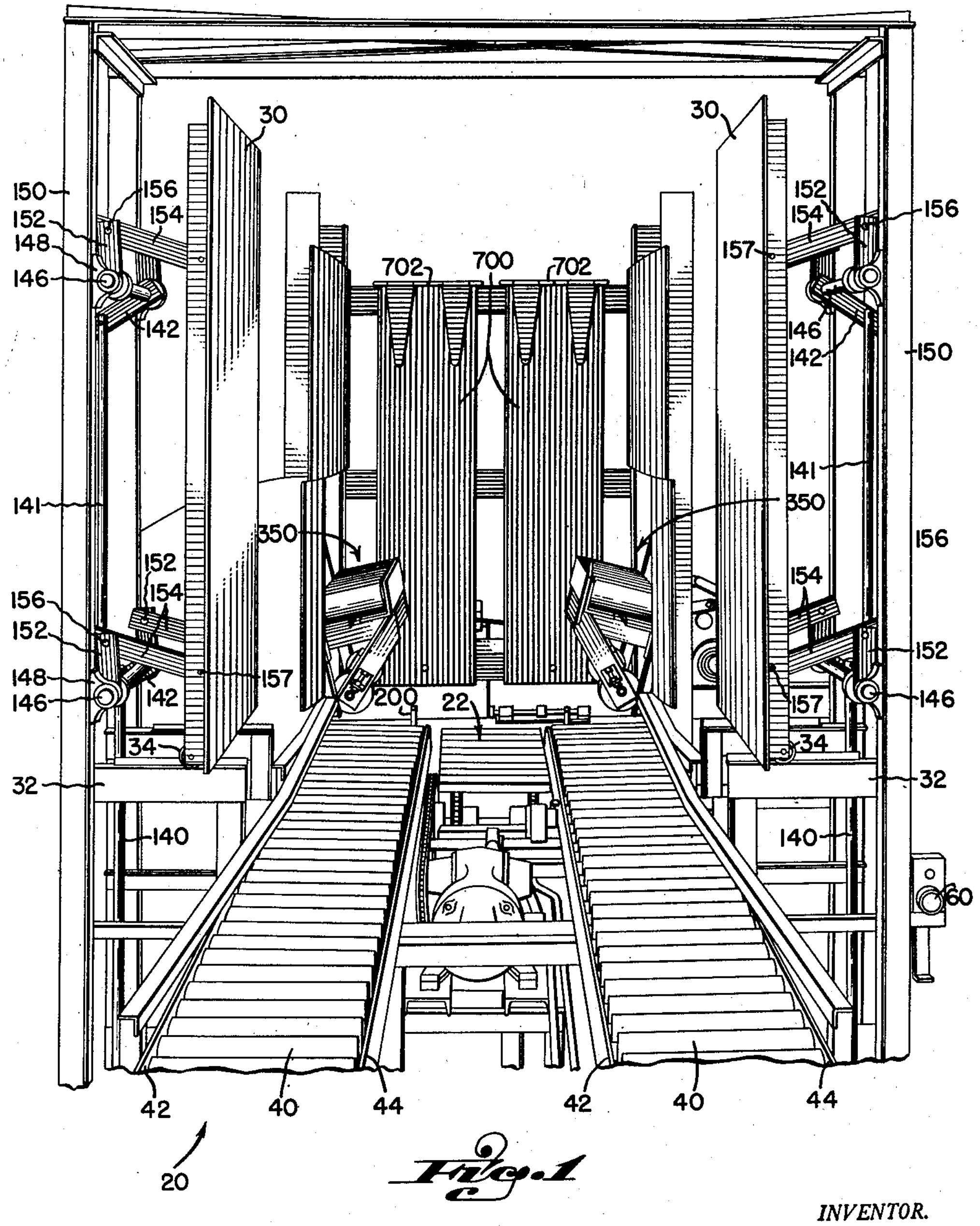
Fig. 1 is a front elevational view of the upper or loading level of a pallet handling device embodying the teachings of the present invention.
Figure 2:
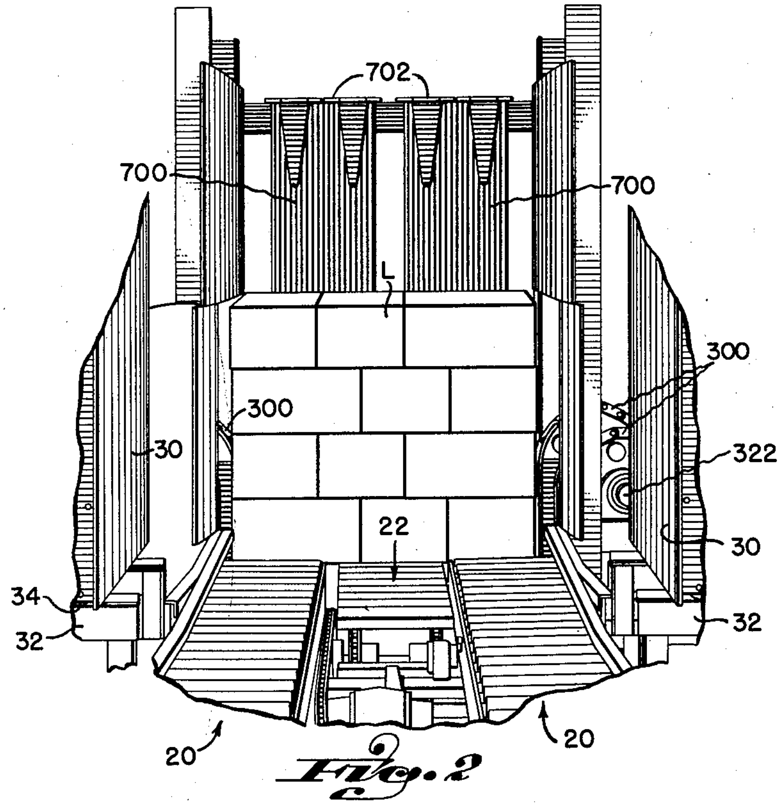
Fig. 2 is a partial view of the discharge end of the conveyor of Fig. 1 illustrating the relationship of the various conveyor elements after a loaded pallet has been deposited onto the elevator which is in the process of being lowered.
Figure 5:
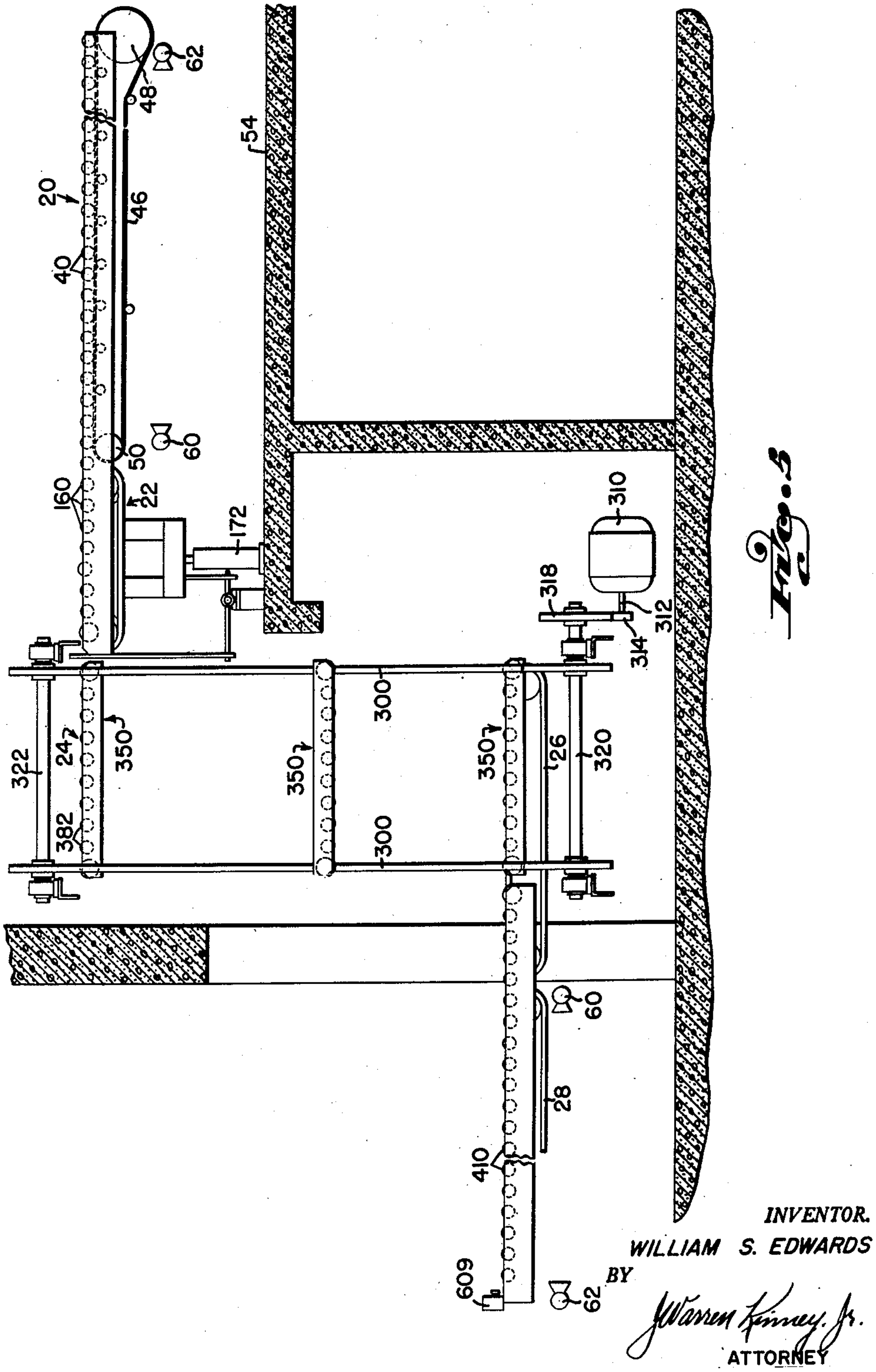
Fig. 5 is a vertical schematic, sectional view of the various conveyors and endless elevator of the pallet handling device.
Figure 6:
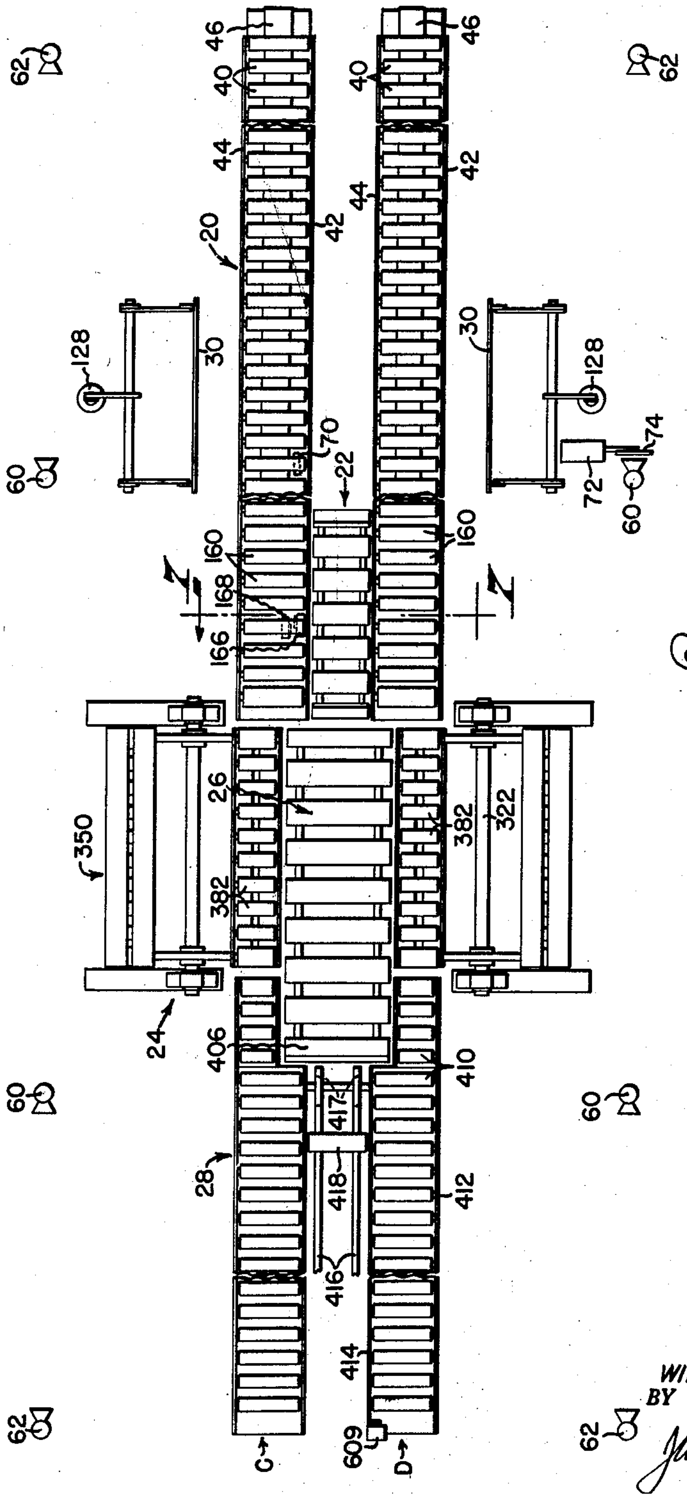
Fig. 6 is a schematic top view of the conveyor and elevator mechanism of Fig. 5, but wherein the upper and lower conveyor mechanisms have been illustrated as though on a common level, solely for clarity of detail and understanding.

With reference to Figs. 1, 5 and 6, the numeral 20 denotes generally a first conveyor upon which loaded pallets are deposited for movement toward a second or loader conveyor 22 by which they are loaded, one at a time, onto a third conveyor 24 comprising part of an endless elevator device on which the pallets are transferred to the unloading level and deposited on a fourth or elevator unloader conveyor 26, which moves the pallets onto a fifth or unloader conveyor 28 from which the pallets are removed.

In order to insure that the various articles supported on the individual pallets will be in proper vertical alignment prior to the time when the pallets are presented to the loader conveyor 22 preparatory to being loaded onto the elevating mechanism, I provide a pair of transversely shiftable article-aligning elements 30 in advance of the loader conveyor which are automatically actuated toward and away from each other for engaging opposite side edges of articles stacked upon a pallet.

With particular reference now to Fig. 1, the first conveyor 20 comprises a plurality of rollers 40 suitably journaled between end plates 42 and 44 and in contacting relationship with the upper reach of an endless belt 46 (note Fig. 5) which passes over pulleys 48 and 50, and wherein pulley 48 is driven by means of an electric motor 41. Movement of belt 46 causes rollers 40 to rotate in the same direction for thereby transporting an article supported thereon, such as, by way of example, a pallet.

It is contemplated that loaded pallets will be deposited upon conveyor 20 by any suitable means such as, by way of example, a fork-type lift truck supported upon surface 54. In order that the pallets may be properly deposited upon the first conveyor 20, I provide means, including an electric eye 60 and a source of light 62, on opposite sides of the conveyor, for opening or breaking the electric circuit to drive motor 41 for stopping it during those periods of time when the light beam to either of the electric eyes 60 is interrupted such as by means of the presence of a fork-type lift truck.

Figure 16:
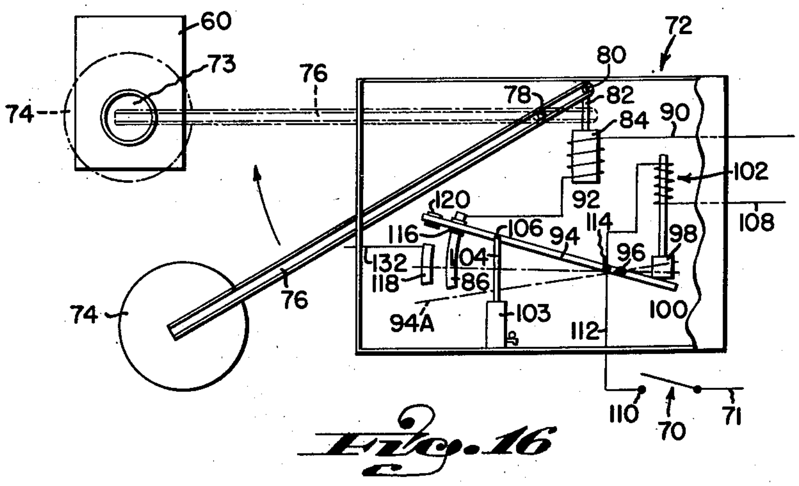
Fig. 16 is a diagrammatic view of a combination timer mechanism and shutter control which is utilized to actuate the pallet aligning mechanism and control the operating characteristics of the first conveyor on the loading level.

When the beam of light has been re-established, the pallets will be conveyed to the left, with reference to Figs. 5 and 6, toward the second or loader conveyor 22. However, before reaching conveyor 22 a normally open switch 70 will be actuated or closed by a pallet being conveyed along conveyor 20 for completing an electric circuit to a timer device denoted generally by the numeral 72. As best illustrated in Fig. 16, timer 72 includes a shutter 74 shiftable between the lowered position illustrated in solid outline to the elevated, light-beam-interrupting position indicated in dotted outline for thereby stopping conveyor 20, it being understood that the numeral 73 denotes the lens aperture of photoelectric cell 60.

Target 74 is secured to and carried by lever 76 pivoted at 78 and secured as at 80 to plunger 82 of a solenoid 84 the winding of which is in series circuit with contactor segment 86 and power line 88 via conductors 90 and 92.

The numeral 94 denotes a contact arm pivoted at 96 for movement between the fully raised position indicated by the solid lines and the fully lowered position 94A indicated by the dash lines. A weight 98 will normally engage the rear end 100 of arm 94 for urging it to fully raised position, however the weight will be lifted from the arm incident to energization of solenoid 102, thereby permitting the arm to swing downwardly at a rate determined by dash pot 103, plunger 104 of which is secured to the arm as at 106.

One side of solenoid 102 is connected to power line 88 by conductor 108, the other side being connected to contact 110 of switch 70 by conductor 112, which is likewise connected to arm 94 as at 114, said arm including a brush or contactor member 116 engageable with segment 86.

A second, smaller segment 118 is engageable by contactor member 120, which is in series circuit with conductor 112 via arm 94. An electrically actuated magnetic valve 130 (Fig. 14), which controls the flow of pressure media to and from cylinders 128, is in series circuit with segment 118 and line 88 by conductors 132 and 134.

Figure 14:
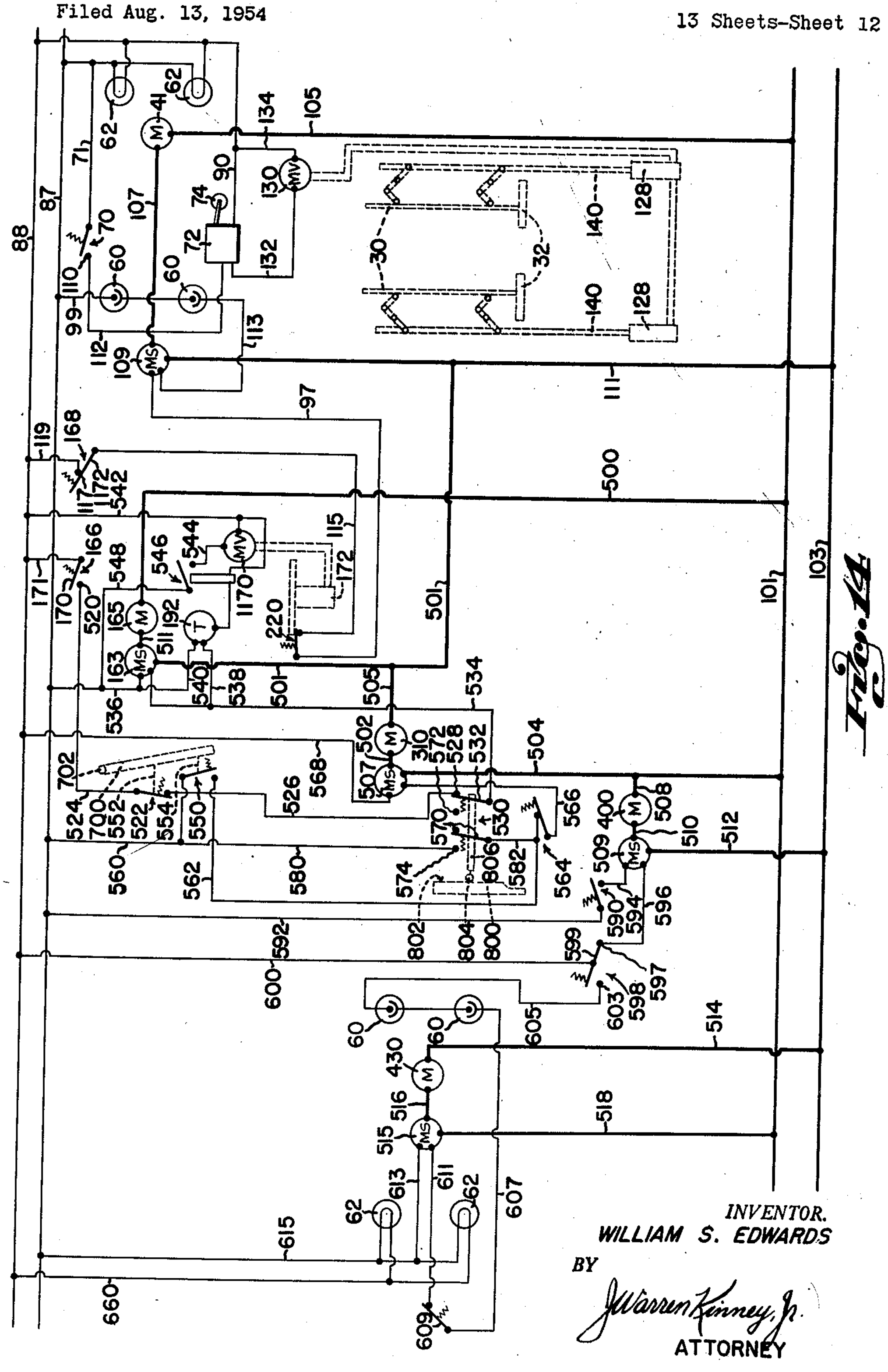
Fig. 14 is a wiring diagram of the control circuit comprising a detail of the invention.

As best illustrated in Fig. 14, the movable arm of switch 70 is in series circuit with power line 87 via conductor 71.

From the foregoing it will be noted that actuation of switch 70 will complete an electrical circuit to each of solenoids 84 and 102 whereby shutter 74 will be elevated for interrupting the passage of light to electric eye 60, thereby stopping conveyor 20. Simultaneously therewith weight 98 will be lifted, permitting arm 94 to swing downwardly at a rate determined by the dash pot 103. When contactor member 120 engages segment 118 a circuit will be closed through magnetic valve 130 for introducing pressure media into cylinders 128, said valve being automatically opened for exhausting pressure media from said cylinders when member 120 moves out of contact with the segment. Contactor member 116 will be disengaged from segment 86 when arm 94 reaches its lowermost position 94A, whereupon solenoid 84 will be de-energized and shutter 74 will be lowered out of interfering realtionship with the light beam to photoelectric cell 60, thereby starting conveyor 20.

Solenoid 102 will remain energized so long as a pallet engages and closes switch 70 whereby the arm will remain in lowered position 94A until switch 70 is opened for dropping weight 98 upon the end of the arm for elevating it to position 94.

With particular reference now to Fig. 1, the numeral 140 denotes an actuator rod the lower end of which is in driven relationship with a pitson (not illustrated) of cylinder 128, and the upper end of which engages a lever 142 secured in driven relationship to a shaft 146 journaled as at 148 to uprights 150. A pair of levers 152 are secured in driven relationship to shaft 146, their free ends pivotally engaging links 154 as at 156, said links pivotally engaging the aligning members 30 as at 157.

If desired, the weight of members 30 may be transferred to track members 32 via wheels 34, thereby insuring transverse motion of the members in a horizontal direction. In Fig. 1 I have illustrated duplicate upper and lower actuator means, it being understood that rod 141 interconnects the free ends of levers 142.

When magnetic valve 130 is open, the aligning members 30 are automatically shifted toward one another whereby to engage the sides of the articles piled upon the pallet which is actuating switch 70 for thereby disposing said articles in substantial vertical alignment.

After the operating cycle of the article-aligning elements has been completed, the pallet will be conveyed toward the discharge end and advanced onto idler rollers 160 which are similar to driven rollers 40, except that they are not driven by belt 46.

Figure 7:
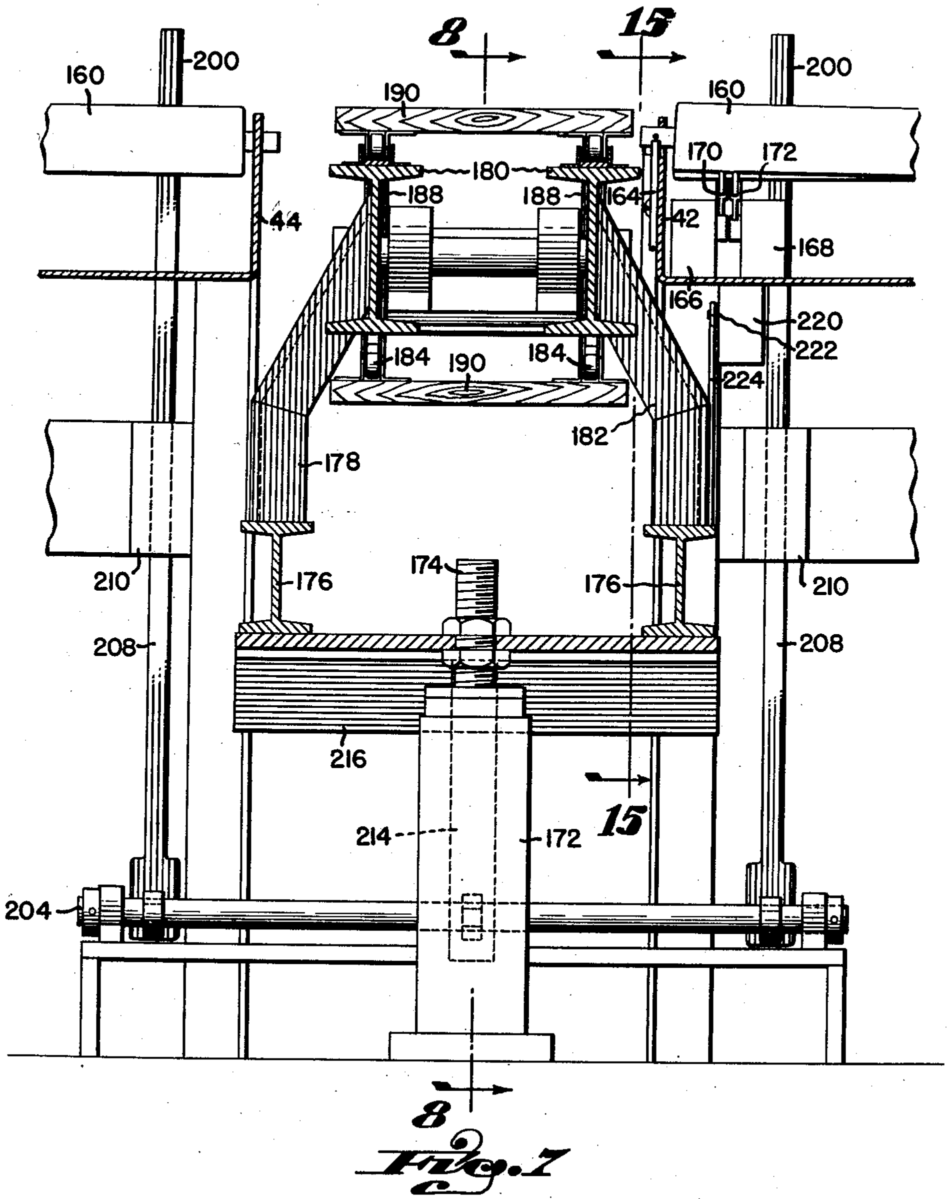
Fig. 7 is an enlarged sectional view taken on line 7—7 of Fig. 6, illustrating a detail of the invention.
Figure 15:
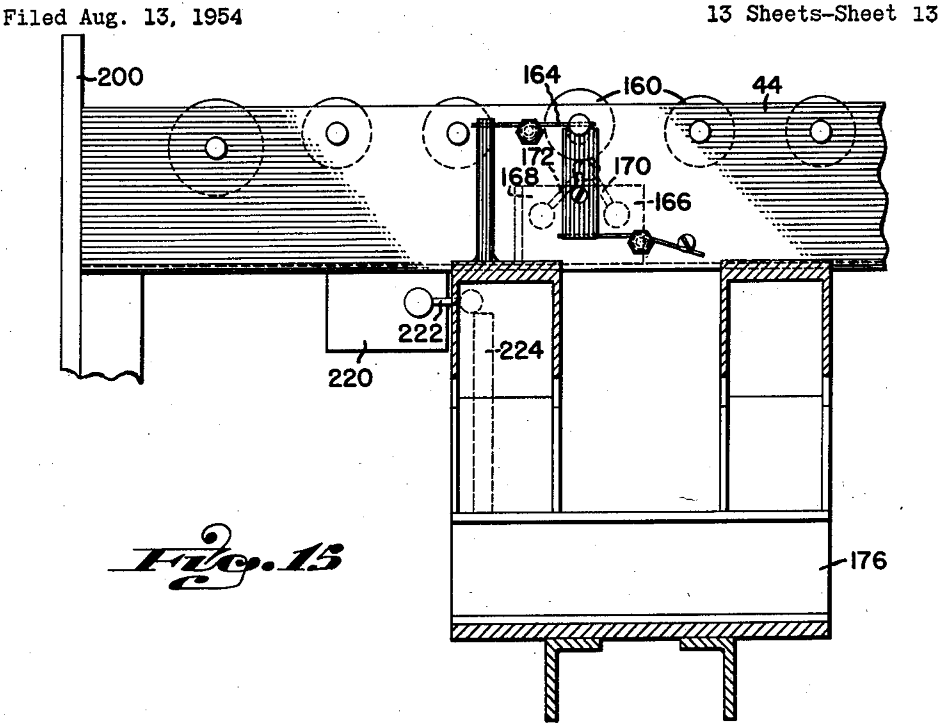
Fig. 15 is a sectional view taken on line 15—15 of Fig. 7.

As best illustrated in Figs. 7 and 15, the innermost end of one of the idler rollers 160 of the first conveyor may be normally and yieldably elevated such as by means of a spring 164 whereby to be depressed by and under the weight of a pallet passing thereover. A pair of switches 166 and 168 are mounted below and adjacent roller 160 in such a manner that lowering thereof will result in positive actuation of the switches through actuator arms 170 and 172, respectively.

Actuation of switch 166, which is normally open, completes an electrical circuit to drive motor 165 through magnetic switch 163 for driving the loader conveyor 22 forwardly, and for simultaneously completing an electrical circuit to a magnetic valve, indicated in the circuit diagram of Fig. 14 by the numeral 1170, thereby opening said valve for introducing pressure media into cylinder 172, the piston, not illustrated, of which is operably connected to shaft 174 (see Figs. 7 and 8), to which a framework including a lower horizontal element 176 and a pair of upstanding, vertically disposed elements 178 are secured.

As best illustrated in Fig. 7, a pair of laterally spaced I-beams 180 are secured to and carried by members 182 supported on beams 178. An endless conveyor, Fig. 8, including a pair of laterally spaced sprocket chains 184 which engage sprocket wheels 186 and 188, is provided, and a plurality of transverse slats 190 are secured to and in spanning relationship with the sprocket chains.

One or the other or both of sprocket wheels 186 and 188 are in driven relationship with motor 165 by any suitable means, not illustrated.

It will be understood that actuation of cylinder 172 will bodily lift the entire loader conveyor assembly 22, whereby slats 190 will engage the center portion of a pallet the opposite side edges of which are disposed upon idler rollers 160. Elevation of loader conveyor 22 will bodily lift a loaded pallet which will then be automatically conveyed on and by slats 190 forwardly onto the rollers 382 of the elevator shelves.

In the preferred embodiment of the invention, an electric timer mechanism, denoted generally by the numeral 192 (Fig. 14) is provided in series circuit with the magnetic valve 1170 for controlling the duration of the operating cycle of the loader conveyor which permits the conveyor to be operated in an elevated condition for a certain minimum length of time, sufficient to enable a load pallet to be loaded onto the elevator brackets. At the end of the cycle the circuit to motor 165 will be opened and the magnetic valve deenergized for exhausting pressure media from cylinder 172.

Actuation of switch 168, which occurs simultaneously with actuation of switch 166, will open the electrical circuit to motor 41, which drives the first conveyor 20, for thereby precluding the delivery of pallets onto loader conveyor 22 during those periods of time when it is in an operating cycle for advancing a loaded pallet onto the elevator shelves. With particular reference to Fig. 14, it will be noted that motor 41 is in series circuit with power lines 101 and 103 via conductors 105, 107, magnetic switch 109, and conductor 111, and that the magnetic switch is in series circuit with low voltage power line 87 via conductor 99, photoelectric cells 60, conductors 113 and 97, switch 220, conductor 115 to arm 1172 of switch 168, contact 117 of which is connected to line 88 via conductor 119.

Figure 8:
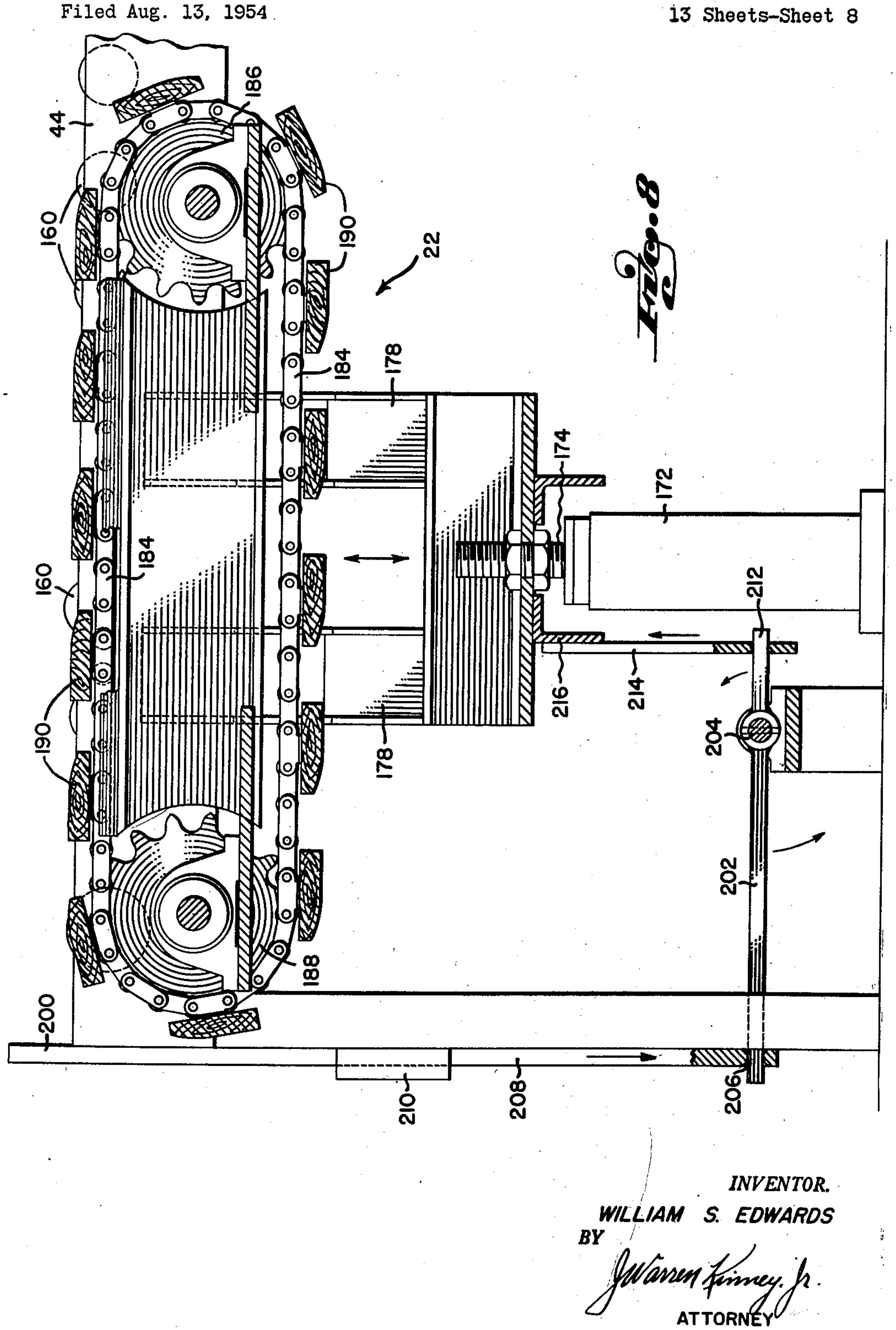
Fig. 8 is a sectional view taken on line 8—8 of Fig. 7.

As best illustrated in Figs. 1, 7 and 8, stop elements 200 are disposed beyond the discharge end of rollers 160 of the first conveyor for precluding the accidental or unintentional forward movement of a pallet into the elevator shaft. In the preferred embodiment of the invention the stop elements 200 are automatically lowered incident to the raising or elevating of loading conveyor 22, by means of a lever 202 pivotally connected as at 204 to a rigid portion of the framework, wherein the forward end is engaged as at 206 by the lower end of a rod 208 which slidably engages housing 210, the upper end of rod 208 comprising stop member 200. The other end of lever 202 is connected as at 212 to the lower end of a rod 214 secured to and depending from a bracket 216 comprising part of the under-structure of the framework of the loader conveyor. From the foregoing, it will be noted that elevation of conveyor 22 will result in lowering of stop members 200, thereby permitting a pallet to be discharged onto the elevator.

With reference again to Fig. 15, the numeral 220 denotes a switch suitably secured to and carried by the framework in which rollers 160 are supported. The switch includes an actuator arm 222 which is adapted to be engaged by the upper end of a rod 224 secured to and carried by a portion of the framework of conveyor 22. The purpose of switch 220, which is in series circuit with switch 168, is to make certain that the first conveyor 20 will remain inoperative so long as the loader conveyor 22 is in an operating cycle and elevated position. The spring elevated roller 160 will be released from its lowered position when the depressing pallet is lifted therefrom incident to actuation of the loader conveyor.

*Elevator*

Figure 9:
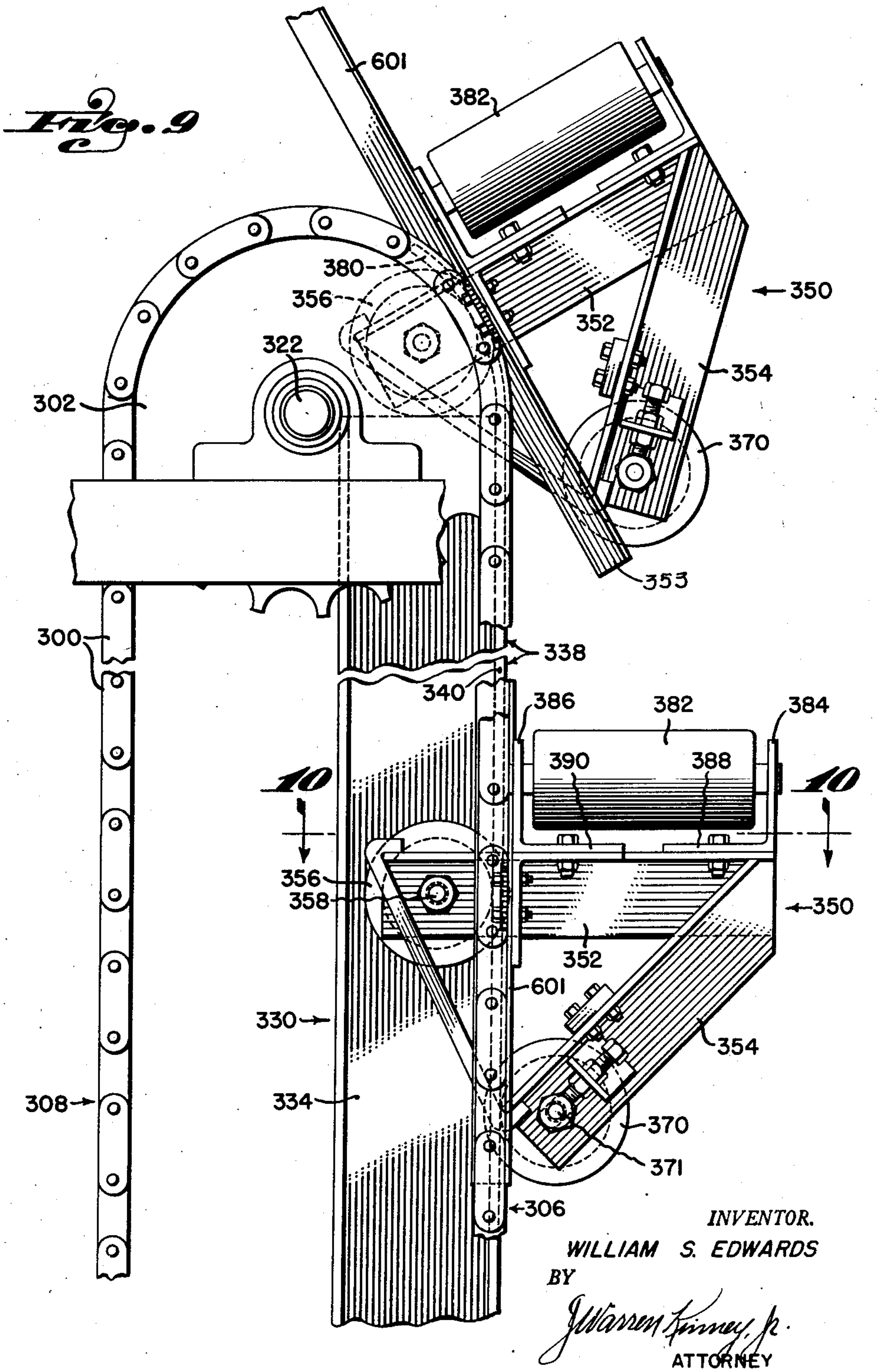
Fig. 9 is an enlarged side view illustrating the structural and operational details of the shelf carrying, track engaging trollies comprising a detail of the elevator mechanism.
Figure 11:
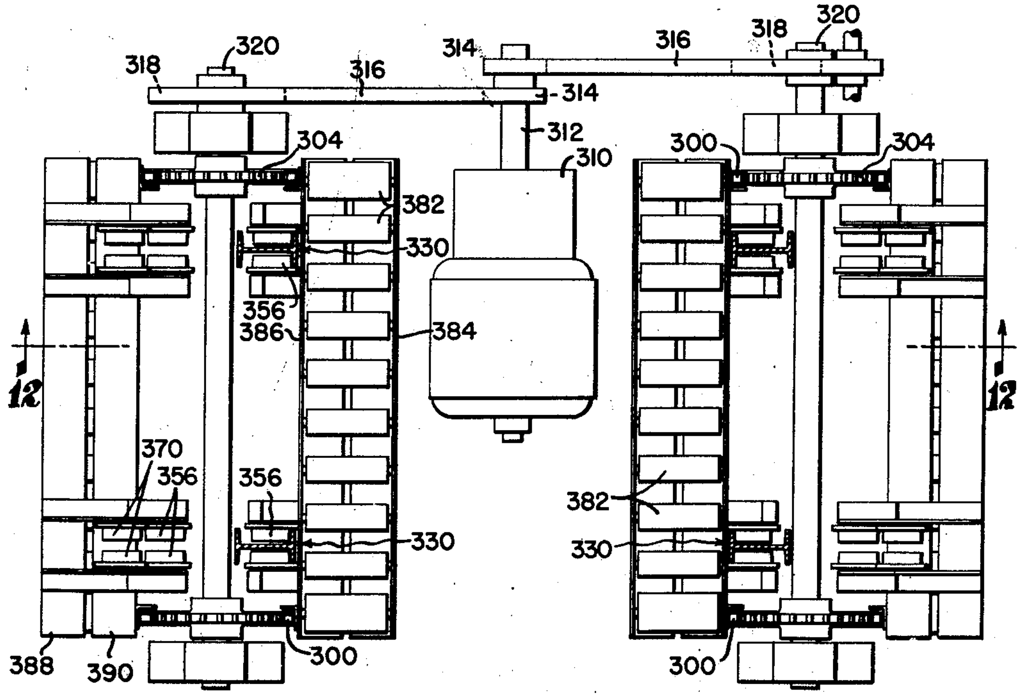
Fig. 11 is a top schematic view illustrating the elevator driving mechanism.
Figure 12:
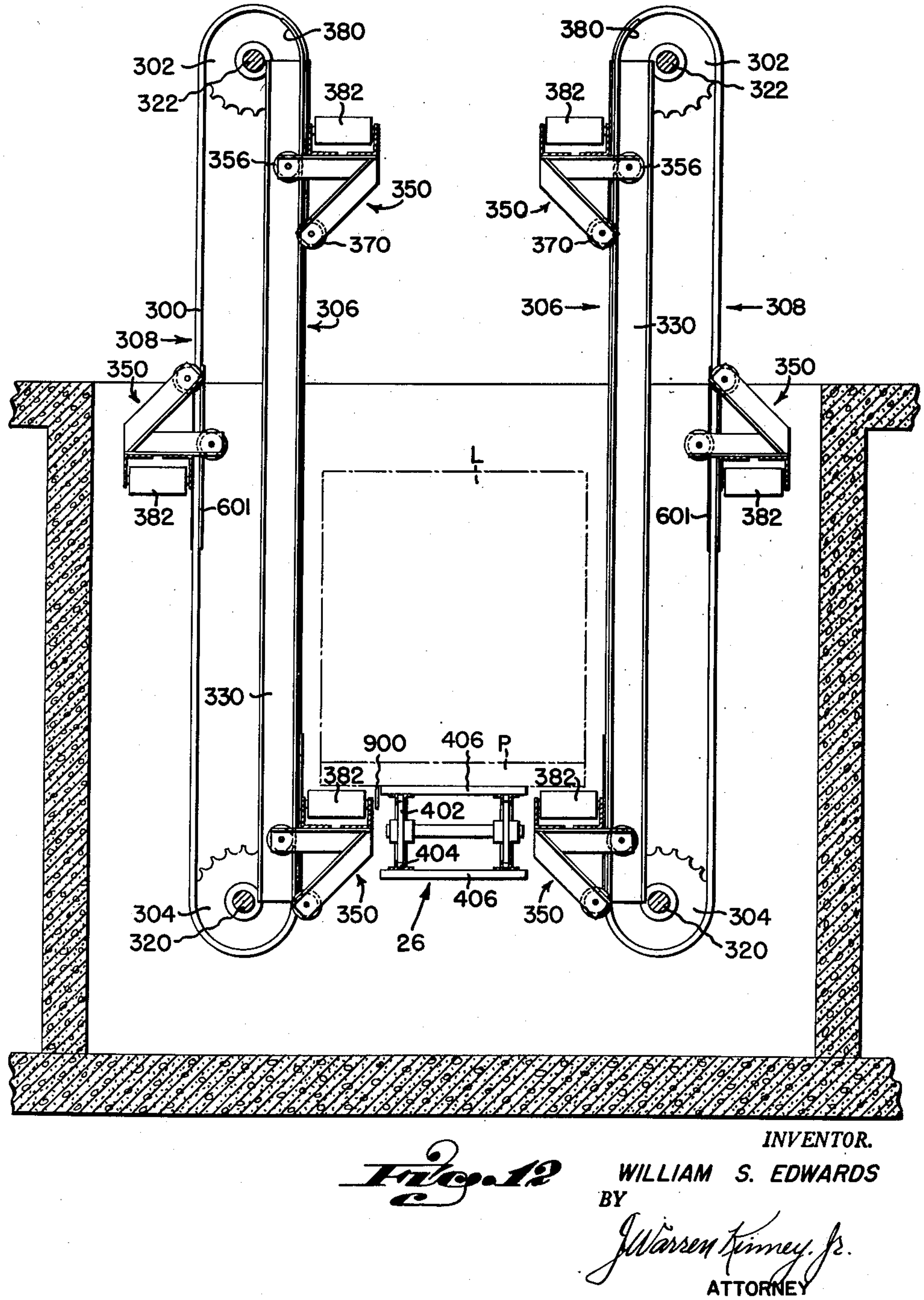
Fig. 12 is a sectional view taken on line 12—12 of Fig. 11.

As best disclosed in Figs. 1, 9 and 12, the elevator comprises two laterally spaced sets of endless members 300 which pass over sprocket wheels 302 and 304 and each of which includes an inner, adjacent reach 306 and an outer or remote reach 308. The endless members of both sets may be driven at the same speed by the drive illustrated in Fig. 11, wherein the numeral 310 denotes an electric motor having a shaft 312 provided with sprocket wheels 314 connected by sprocket chains, or the like 316 to sprocket wheels 318 keyed to drive shafts 320. The present invention is not directed to nor concerned with the particular manner in which the drive and driven shafts 320 and 322 are supported and journaled in spaced parallelism on opposite sides of the elevator shaft, said detail, being conventional, has been omitted from the drawings.

Figure 10:
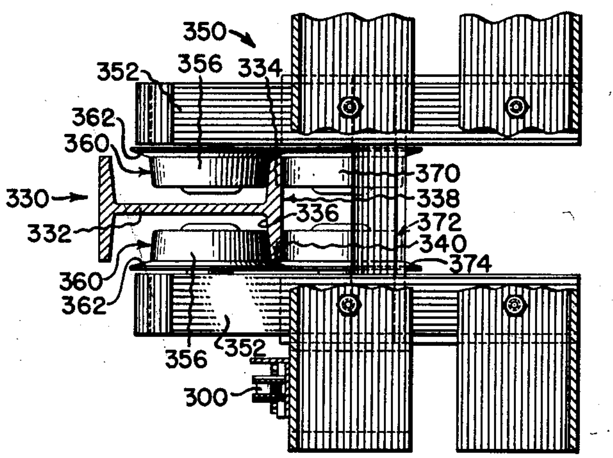
Fig. 10 is a sectional view taken on line 10—10 of Fig. 9.

Elongate tracks 330 are provided between the loading and unloading levels in parallelism with the inner reaches 306 of the endless members. Each of the tracks includes a central web portion 332 and a flange 334 having inner, outer and end faces 336, 338 and 340, respectively, see Fig. 10.

Trollies 350 are secured to and carried by each of the endless members for movement therewith. As best illustrated in Figs. 9 and 12, each trolley includes an upper or shelf portion 352 to the rear end of which a pair of laterally spaced flanged wheels 356 are rotatably mounted as at 358 whereby, note Fig. 10, portions 360 will engage and ride upon inner face 336 of the flange and flanged portion 362 of the wheels will engage and ride upon end faces 340.

A bracing portion 354 is fixedly secured to the forward end of shelf 352 and a pair of laterally spaced flanged wheels 370 are rotatably mounted as at 371, portions 372 of which will engage and ride upon outer face 338 and the flanged portions 374 of which will engage end faces 340. The inner, or wheel-adjacent ends of the shelf and bracing portions 352 and 354, respectively, are permanently interconnected by connector 353 which forms the third leg of the triangular shaped trollies 350. As clearly apparent from Fig. 9, a trolley will be solidly though movably mounted in an upright, horizontal, load sustaining condition when its wheels engage the track flange.

In the preferred embodiment of the invention the forward flange of each track member is extended upwardly and thence curved inwardly as at 380 along an arc having its center on shaft 322 to automatically guide the flanged wheels 356 and 370 onto the track flange as the trollies approach the inner reaches of the endless members.

With further reference to Figs. 9 and 12, it will be noted that each of shelf portions 352 is provided with a plurality of laterally spaced idler rollers 382 suitably journaled between end plates 384 and 386 of brackets 388 and 390, respectively, secured to and carried by shelf portions 352.

The shelves are arranged in pairs, note Figs. 1, 11 and 12, whereby to support the side edges of a pallet which spans them. The shelves of each pair are disposed in laterally spaced horizontal alignment for movement from a loading to unloading level along straight vertical paths.

The successive pairs of shelves are spaced so that a pair will be concurrently located at loading and unloading level, as hereinafter more fully explained.

The elevator unloader conveyor 26 comprises an endless slat type conveyor disposed between the adjacent ends of the elevator shelves and mounted whereby to receive and support the full weight of a pallet spanning a pair of shelves as they approach the unloading level. In Fig. 12 the letter P denotes a pallet and the letter L a stack of articles supported thereon, and wherein the lower pair of shelves is at unloading level, the pallet having been transferred onto conveyor 26. The upper pair of shelves is located at loading level.

An electric motor 400, Fig. 14, may be utilized to drive sprockets 402 which carry endless members 404 to which slats 406 are secured for transferring a pallet from the elevator onto an unloader conveyor 28.

The unloader conveyor 28 comprises a pair of laterally spaced, axially aligned runs C and D including idler rollers 410 suitably journaled between end plates 412 and 414. A live conveyor comprising endless members 416 interconnected at spaced intervals by slats or pusher blocks 418 is located between runs C and D. The spacing between successive pusher blocks 418 is of a dimension greater than the overall length of a pallet P, note Fig. 4. An electric motor 430 is provided for driving the sprockets 417 over which the endless members 416 pass.

Figure 4:
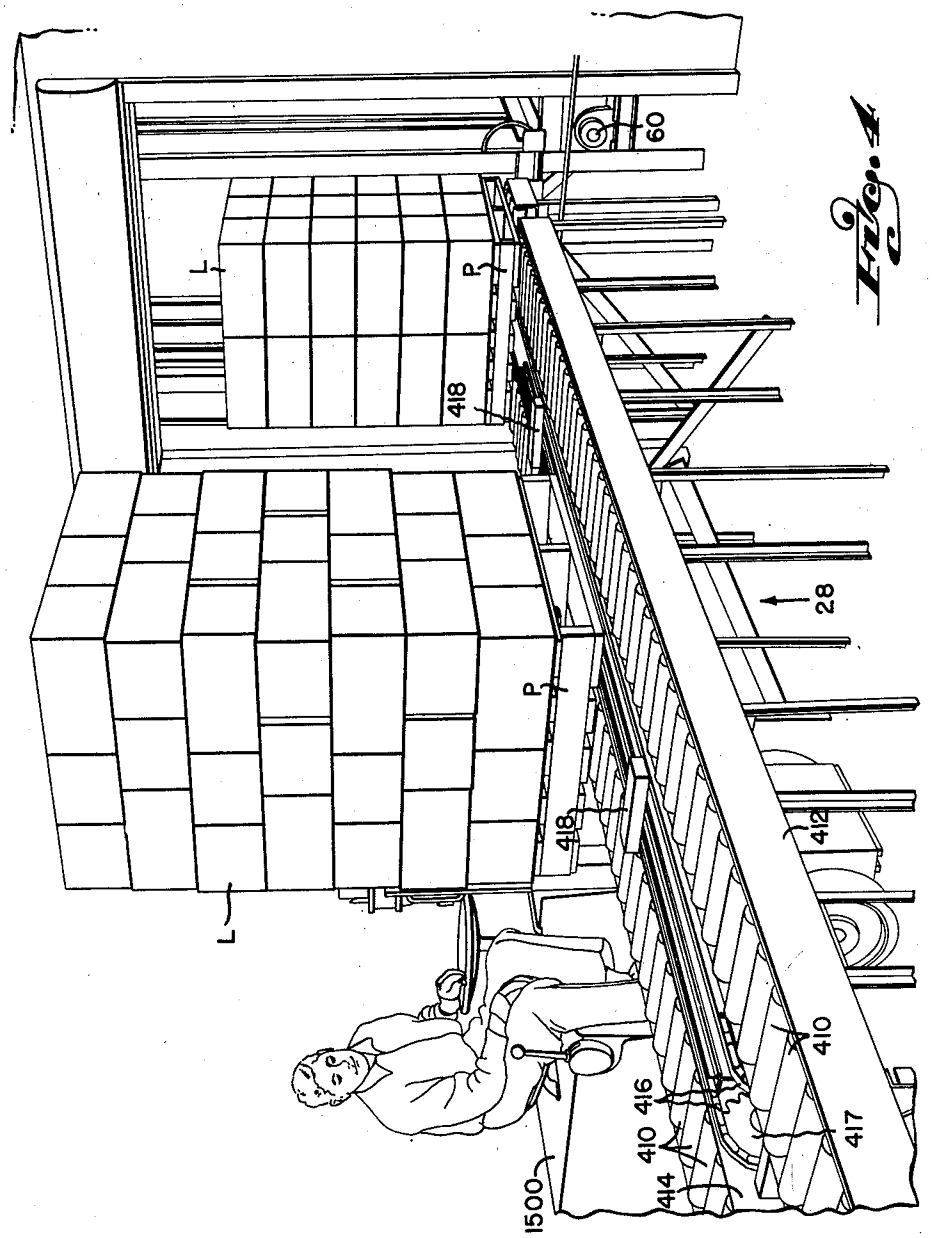
Fig. 4 is a side elevational view of the unloading level illustrating the manner in which loaded pallets are received at and unloaded from this level.

Electric eyes 60 and sources of light 62 are located on opposite sides of the unloader conveyor, as in the case of the first conveyor on the loading level, for automatically breaking the electric circuit to motor 430 whenever either beam of light is interrupted. In Fig. 4 I have illustrated a fork-type lift truck 500 which is being operated to remove a loaded pallet from the unloading conveyor 28. When so positioned the truck will interrupt the beam of light to the photoelectric cell on the left side of the conveyor, thereby stopping motor 430, or preventing it from being actuated while the light beam is interrupted.

*Control circuit*

As illustrated in Fig. 14, five electric motors are utilized, one for each of the different conveyors and one for the elevator, as follows: Motor 41 for the first conveyor 20, in series circuit with lines 101 and 103 via conductors 105, 107, magnetic switch 109 and conductor 111. Motor 165 for the loader conveyor is in series circuit with lines 101 and 103 via conductors 500, 511, magnetic switch 163 and conductors 501 and 111. The elevator motor 310 is connected across said lines via conductors 111, 501, 505, 502, magnetic switch 507 and conductor 504; elevator unloader conveyor motor 400 via conductors 504, 508, 510, magnetic switch 509 and conductor 512; and unloader conveyor motor 430 by conductors 514, 516, magnetic switch 515 and conductor 518.

The operating characteristics and control circuit for the first and loading conveyors have already been described in detail and will not be repeated here, except by way of summary as follows:

A pallet being conveyed on the first conveyor will engage and close switch 70 thereby actuating a timer 72 which stops motor 41 and initiates the article-aligning cycle in which plates 30 are shifted toward one another and then apart for aligning the side edges of articles stacked on a pallet before it reaches the loader conveyor. At the end of the said cycle the first conveyor will be driven for moving a pallet toward its discharge end and over idler rollers 160 for opening switch 168 and closing switch 166, arm 170 of which is connected to supply line 88 via conductor 171.

Contact 520 is in series circuit with line 87 via conductor 524, switch 522, conductor 526, contact 528 of a double pole double throw switch 530, contact arm 532 thereof, conductor 534, magnetic switch 163 and conductor 536. Timer 192 is in parallel circuit with the magnetic switch via conductors 538 and 540 whereby to be energized for actuating magnetic valve 1170 each time the motor 165 is energized. The magnetic valve being in series circuit with lines 87 and 88 via conductor 542, 544 switch 546 and conductors 548 and 536 whereby pressure media will be admitted to cylinder 172 for elevating the entire loader conveyor assembly during those periods of time when switches 170, 522 and 530 are closed.

Operation of motor 165 will therefore advance a pallet onto the rollers of the laterally spaced shelves of an elevator at the upper or loading level. When the pallet has been fully received on the shelves its forward end will abut against and move the lower end of one or more depending elements 700 pivotally secured as at 702 from a suitable stationary portion of the elevator shaft.

Switch 522 will be opened and switch 550 closed via connectors 552 and 554 incident to movement of the lower end of member 700 in a clockwise direction (Fig. 14) for thereby breaking the electric control circuit to motor 165 of the loader conveyor and simultaneously closing an electric circuit to the elevator motor 310 via conductor 560, switch 550, conductor 562, switch 564, conductor 566, magnetic switch 507 and conductor 568.

Switch 166 will be automatically opened and switch 168 automatically closed as the pallet being loaded onto the elevator shelves no longer contacts and depresses the control roller best illustrated in Figs. 7 and 15.

At this point it should be noted that an elongate cam bar 800 is secured to and carried by one of the trollies of each pair, said cam bar having a surface 802 engageable by a roller follower 804 (Fig. 14) secured to and carried by member 806 which connects contact arms 532 and 570 of the double throw double pole switch 530, for shifting the contact arms against the counter force of a spring, to the right. However, when the elevator is driven so that the cam bar is moved downwardly and out of contact with the follower roller, the contact arms 532 and 570 will be automatically shifted to the left to engage contacts 572 and 574, respectively. Therefore, as a pallet is lowered from the loading level it will move out of contact with element 700, which will then be free to assume the position indicated in Fig. 14 wherein switch 522 is closed and 550 is open.

However, the relationship of the various cam bars 800 is such that before a pallet disengages element 700 the cam bar will have been shifted out of contact with follower 804, thereby establishing an electric circuit to the elevator motor 310 via conductor 580, contact 574, conductor 582, switch 564, conductor 566, magnetic switch 507 and conductor 568.

Switch 528 will likewise be opened when cam bar 800 disengages the roller follower 804 for breaking the control circuit to motor 165 of the loader conveyor, thereby preventing the loading of a pallet into the elevator shaft except when a pair of elevator shelves are at the loading level.

Figure 3:
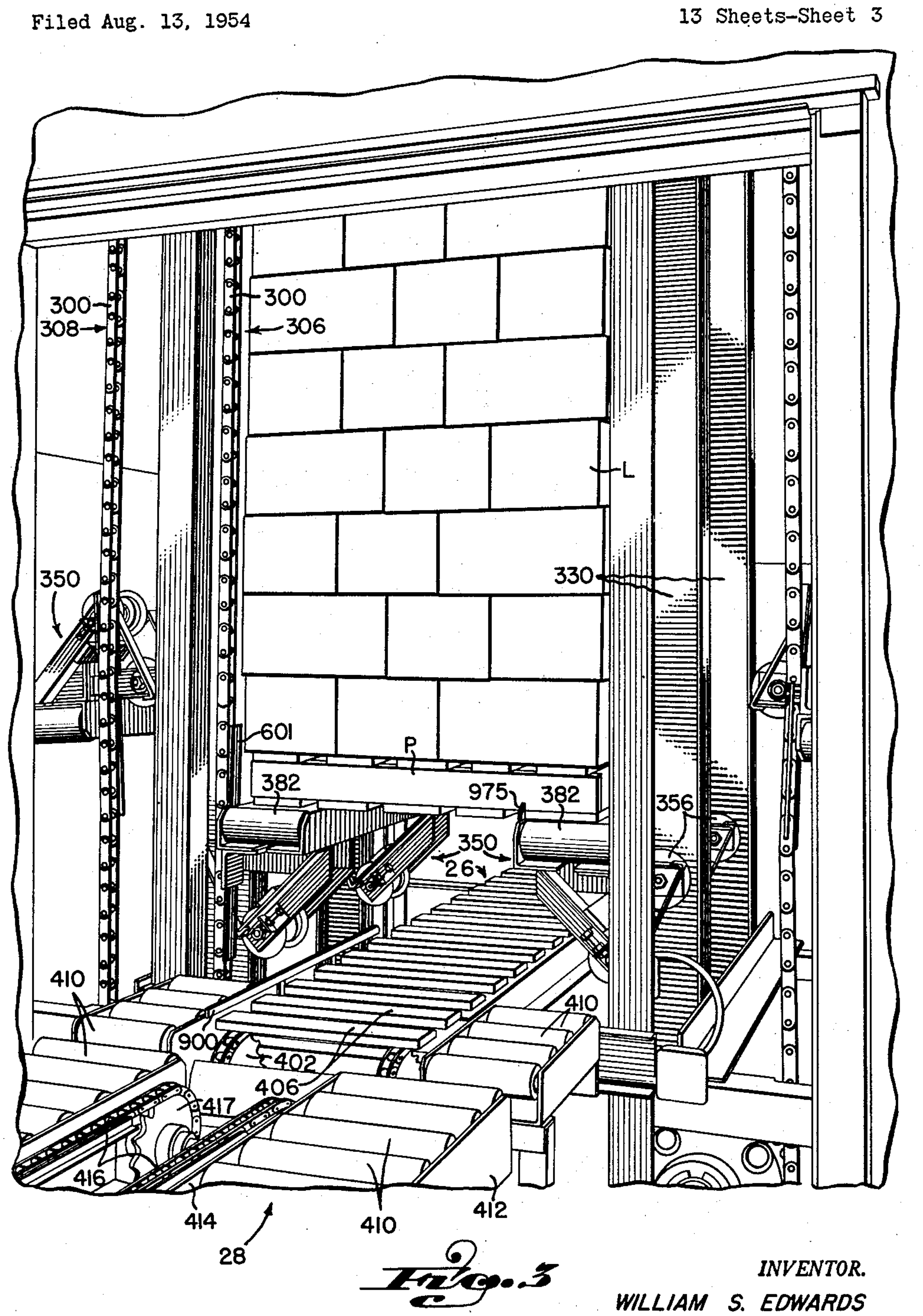
Fig. 3 is a front elevational view of the lower or unloading level of the pallet handling device of Fig. 1.

With reference now to Fig. 3, the numeral 900 denotes a spring loaded switch actuator bar which when depressed by a pallet as it reaches the unloading level will open switch 564 of Fig. 14 for breaking the control circuit to the elevator motor 310. Since bar 900 projects outwardly beyond the vertical confines of the elevator, it will be depressed and switch 564 maintained in circuit breaking position until a pallet has been discharged from the elevator unloader conveyor 26 onto the unloader conveyor 28.

A normally open switch 590 is in series circuit with lines 87 and 88 via conductors 592, 594, magnetic switch 509, conductor 596, contact 597 of switch 598 arm 599 thereof and conductor 600, said switch being closed by engagement with guide member 601 of the trollies, note Fig. 12, thereby starting the elevator unloader conveyor incident to the approach of a pair of elevator shelves to the unloading level. As the trollies are moved away from the unloading level switch 590 will automatically open for stopping motor 400.

As a pallet is moved onto the unloader conveyor, switch 598 will be actuated for closing a control circuit to motor 430 via arm 599, contact 603, conductor 605, electric eyes 60, conductor 607, switch 609, conductor 611, magnetic switch 515, conductors 613 and 615, however the switch will remain closed only so long as engaged by a pallet whereby motor 430 will be intermittently operated for advancing the unloader conveyor one pallet length at a time.

Switch 609 has been provided for preventing operation of motor 430 in the event the unloader conveyor should become filled with pallets, thereby stopping operation of the other conveyors and elevator, in the following manner: The circuit to motor 400 will be broken at switch 598 so that a pallet will remain on bar 900 of switch 564, thereby breaking the circuit to elevator motor 310. A pallet loaded onto the elevator shelves at the loading level will engage element 700 for opening switch 522, thereby breaking the circuit to loader motor 165, and the circuit to the first conveyor motor 41 will be broken at switch 168 or 220, thereby bringing the entire device to a standstill.

Figure 13:
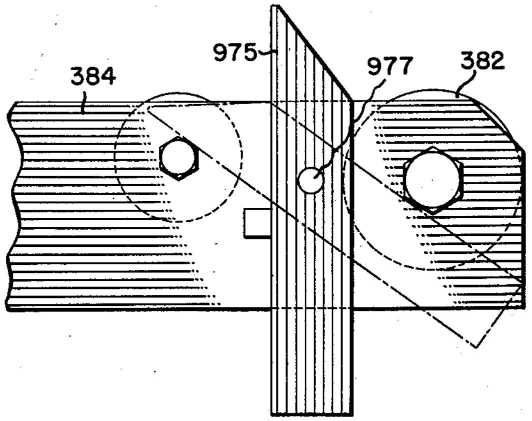
Fig. 13 is a side view of a detail of the pallet arresting mechanism comprising a detail of the invention.

With reference now to Fig. 13, the numeral 975 denotes a gravity actuated automatic latch lever pivoted as at 977 to the end plate of the shelf structure, said lever adapted to engage a pallet for precluding its accidental or unintentional movement off the rollers of the shelves, note Fig. 3.

*Operation*

It is contemplated that the elevator will include at least two sets of elevator shelves which are adapted to be concurrently disposed one each at the loading and unloading levels. In those instances wherein the subject device is utilized to convey articles from an upper loading level to a lower unloading level, the weight of the last loaded set of shelves, note Fig. 3, will, as they approach unloading level, note Fig. 12, deposit their load upon the elevator unloader conveyor 26, thereby greatly simplifying the problem of stopping the elevator under load. I have thus been able to effectively dispense with the need of expensive and cumbersome mechanical and/or electrical braking means, however it should be understood that elevator motor 165 is a conventional electric motor having automatic braking means for maintaining the motor against accidental or unintentional operation except during those periods of time when it is energized.

It will be noted that the elevator will be stopped and at a standstill when a set of shelves are presented to the upper or loading level, and that the load, itself, constitutes the control-circuit-actuating means for causing the elevator to operate to move the shelves toward the unloading level. It will, of course, be understood that the weight of shelves leaving the unloading level will be moved upwardly toward the loading level along the outer reaches 308 whereby to be presented at loading level concurrently with the arrival of another set of shelves at the unloading level.

When loaded pallets are deposited onto the first conveyor 20 at the loading level, it will be stopped until the pallet loading means has been moved away from the first conveyor and out of a light-beam-interrupting relationship with the beams that energize photoelectric cells 60.

Movement of the loaded pallets toward the discharge end of the first conveyor will first close switch 70 for stopping the first conveyor and initiating the operating cycle of the article-aligning elements 30. Upon completion of this cycle the first conveyor will again be actuated for advancing the pallet from the live rollers 40 onto idler rollers 160, thereby closing switch 166 and opening switch 168 for completing an electrical circuit to the loader conveyor 22 while simultaneously stopping the first conveyor. The loader conveyor will then go through an elevating, pallet loading, and lowering cycle providing a pair of elevator shelves are disposed at the loading level. The pallet loaded onto the elevator shelves will close the circuit to the elevator motor providing the unloading level of the elevator is unobstructed. As the trollies of the set of shelves previously at the unloading level are moved away from the loading level, switch 530 will be automatically actuated for completing a second electrical circuit to the elevator motor 310 and for simultaneously breaking the electrical circuit to motor 165 of the loader conveyor 22. As the loaded shelves descend from loading to unloading levels, members 601, which, as clearly illustrated in Figs. 3, 9 and 12, project above and below the trollies 350, engage and close switch 590 for energizing the elevator unloader conveyor motor 400. As the pallet approaches the elevator unloader conveyor 26, spring loaded bar 900 will be depressed so long as a pallet is within the confines of the elevator shaft at the unloading level, and/or as long as a pallet has not been completely advanced off of the elevator unloader conveyor onto the unloader conveyor. The pallet advanced onto the unloader conveyor 28 will automatically close switch 598 for closing an electrical circuit to motor 430, which will be driven until that particular pallet has been advanced whereby to clear switch 598.

Operation of motor 430 of the unloader conveyor will be prevented whenever the beams of light to the photoelectric cells 60 are interrupted, such as, by way of example, by the presence of a fork-type lift truck 1500 of Fig. 4.

From the foregoing, it will be noted that I have provided simple yet highly effective, coordinated means for automatically effecting the conveying of loaded articles along a loading level, of loading them one at a time onto an endless elevator, and of moving them to unloading level where they are automatically unloaded onto an unloaded conveyor.

What is claimed is:

1. A pallet handling device comprising an elevator extending between a loading level and a vertically spaced unloading level, said elevator including pairs of laterally spaced, pallet receptive shelves, means moving said pairs of shelves along continuous paths from one to the other of said levels, a first conveyor at the loading level, a loader conveyor between the first conveyor and elevator, means for raising and lowering the loader conveyor, other means for driving the loader conveyor, a loader conveyor control circuit including circuit closing means actuated by a pallet on the foremost end of the first conveyor for initiating the elevating, conveying and lowering cycle of the loader conveyor during which the foremost pallet is lifted from the first conveyor, advanced onto a pair of elevator shelves at the loading level and the loader conveyor stopped and lowered, said control circuit also including circuit breaking means for stopping the operation of the first conveyor when the loader conveyor is elevated, and an elevator control circuit including circuit closing means actuated by a pallet on the pair of shelves at the loading level.

2. A pallet handling device comprising an elevator extending between a loading level and a vertically spaced unloading level, said elevator including pairs of laterally spaced, pallet receptive shelves, means moving said pairs of shelves in one direction along continuous paths from one to the other of said levels, a first conveyor comprising a pair of laterally spaced, pallet supporting and conveying members at the loading level, retractable stop members at the discharge end of said conveyor, a loader conveyor adjacent the discharge end of and located between said laterally spaced members of the first conveyor, means for raising and lowering and other means for driving the loader conveyor, means actuated by the loader conveyor for retracting said stop members only when the loader conveyor is raised, a loader conveyor control circuit including circuit closing means actuated by a pallet on the discharge end of the first conveyor for initiating an elevating, conveying and lowering cycle of the loader conveyor during which a pallet is lifted from the first conveyor and advanced onto a pair of elevator shelves at the loading level after which the loader conveyor is stopped and lowered, said control circuit also including circuit breaking means for stopping the operation of the first conveyor during the elevating, conveying and lowering cycle of the loader conveyor.

3. A pallet handling device comprising an elevator extending between an upper loading level and a vertically spaced lower unloading level, said elevator including pairs of laterally spaced, pallet receptive shelves, means moving said pairs of shelves in one direction along continuous paths from one to the other of said levels, a first conveyor comprising a pair of laterally spaced, pallet supporting and conveying members at the loading level, retractable stop members at the discharge end of said conveyor, a loader conveyor adjacent the discharge end of and located between said laterally spaced members of the first conveyor, means for raising and lowering and other means for driving the loader conveyor, means actuated by the loader conveyor for retracting said stop members only when the loader conveyor is raised, an unloader conveyor at the unloading level and located between the adjacent ends of the elevator shelves, said unloader conveyor being adapted to receive and support a pallet spanning a pair of elevator shelves as they approach the unloading level, a loader conveyor control circuit including circuit closing means actuated by a pallet on the discharge end of the first conveyor for initiating an elevating, conveying and lowering cycle of the loader conveyor during which a pallet is lifted from the first conveyor and advanced onto a pair of elevator shelves at the loading level after which the loader conveyor is stopped and lowered, said control circuit also including circuit breaking means for stopping the operation of the first conveyor during the elevating, conveying and lowering cycle of the loader conveyor, an elevator control circuit including circuit closing means actuated by a pallet supported on the elevator shelves at the loading level, and circuit breaking means actuated by a pallet supported on the elevator shelves at the unloading level, a control circuit for said unloader conveyor including circuit closing means, and means for actuating said last mentioned circuit closing means incident to the approach of a pair of elevator shelves to the unloading level.

4. A pallet handling device as described in claim 3, wherein the loader conveyor circuit includes circuit breaking means actuated by a pallet supported on the elevator shelves at the loading level, and other circuit breaking means actuated by the elevator-shelf carrying means as each pair of shelves are moved away from the unloading level.

5. A pallet handling device comprising an elevator extending between a loading level and a vertically spaced unloading level, said elevator including pairs of laterally spaced, pallet receptive shelves, means moving said pairs of shelves in one direction along continuous paths from one to the other of said levels and for concurrently disposing successive pairs of shelves at both levels, a first conveyor comprising a pair of laterally spaced, pallet supporting and conveying members at the loading level, a loader conveyor adjacent the discharge end of and located between said laterally spaced members of the first conveyor, a pair of article-aligning elements mounted on opposite sides of said laterally spaced conveyor members in advance of the loader conveyor, means for moving said elements toward and away from each other, over and at right angles with the spaced conveyor members, means for raising and lowering and other means for driving the loader conveyor, a normally closed first conveyor control circuit, an article-aligning element control circuit including circuit closing means for actuating a closing-and-opening cycle of said article aligning elements and circuit breaking means for stopping the first conveyor during the operating cycle of said article-aligning elements, a loader conveyor control circuit including circuit closing means actuated by a pallet on the discharge end of the first conveyor for initiating an elevating, conveying and lowering cycle of the loader conveyor during which a pallet is lifted from the first conveyor and advanced onto a pair of elevator shelves at the loading level after which the loader conveyor is stopped and lowered, said control circuit also including circuit breaking means for stopping the operation of the first conveyor during the elevating, conveying and lowering cycle of the loader conveyor.

6. A pallet handling device comprising an elevator extending between a loading level and a vertically spaced unloading level, said elevator including pairs of laterally spaced, pallet receptive shelves, means moving said pairs of shelves in one direction along continuous paths from one to the other of said levels and for concurrently disposing successive pairs of shelves at both levels, a first conveyor comprising a pair of laterally spaced, pallet supporting and conveying members at the loading level, a normally closed first conveyor control circuit including photo electric cells arranged in spaced parallelism with said first conveyor, means projecting beams of light into said photo electric cells for completing an electric circuit to the drive means for said conveyor, a loader conveyor adjacent the discharge end of and located between said laterally spaced members of the first conveyor, a pair of article aligning elements mounted on opposite sides of said laterally spaced conveyor members in advance of the loader conveyor, said elements including flat surfaces adapted to abuttingly engage and vertically align the outer side edges of articles supported on a pallet, means for moving said elements toward and away from each other at right angles with the spaced conveyor members, means for raising and lowering and other means for driving the loader conveyor, a normally closed first conveyor control circuit, an article-aligning element control circuit including circuit closing means for actuating a closing-and-opening cycle of said article-aligning elements and means for interrupting the beam of light to one of the photo-electric cells for stopping the first conveyor during the operating cycle of said article aligning elements, a loader conveyor control circuit including circuit closing means actuated by a pallet on the discharge end of the first conveyor for initiating an elevating, conveying and lowering cycle of the loader conveyor during which a pallet is lifted from the first conveyor and advanced onto a pair of elevator shelves at the loading level after which the loader conveyor is stopped and lowered, said control circuit also including circuit breaking means for stopping the operation of the first conveyor during the elevating, conveying and lowering cycle of the loader conveyor.

7. A pallet handling device comprising an elevator extending between an upper loading level and a vertically spaced lower unloading level, said elevator including pairs of laterally spaced, horizontally alignable, pallet receptive shelves, means moving said pairs of shelves in one direction along continuous paths from one to the other of said levels and for concurrently disposing successive pairs of shelves at both levels, a first conveyor comprising a pair of laterally spaced, pallet supporting and conveying members at the loading level, a loader conveyor adjacent the discharge end of and located between said laterally spaced members of the first conveyor, means for raising and lowering and other means for driving the loader conveyor, an elevator unloader conveyor at the unloading level and located between the adjacent ends of the pallet supporting shelves to receive, support and convey a pallet carried by and spanning a pair of shelves as they reach the lower level, an unloader conveyor at the unloading level disposed in substantial horizontal alignment with the aforementioned elevator unloader, a first conveyor control circuit, a loader conveyor control circuit including circuit closing means actuated by a pallet on the discharge end of the first conveyor for initiating an elevating, conveying and lowering cycle of the loader conveyor during which a pallet is lifted from the first conveyor and advanced onto a pair of elevator shelves at the loading level after which the loader conveyor is stopped and lowered, said control circuit also including circuit breaking means in series with the first conveyor control circuit for stopping the operation of the first conveyor during the elevating, conveying and lowering cycle of the loader conveyor, an elevator control circuit including circuit closing means operable by a pallet received on a pair of shelves at the loading level and circuit breaking means operable by a pallet on a pair of shelves at the unloading level, a control circuit for the elevator unloader conveyor including circuit closing means, means for actuating said last mentioned circuit closing means when a pair of shelves are adjacent the unloading level, an unloader conveyor control circuit including circuit closing means actuable by a pallet being advanced onto the unloader conveyor by the elevator unloader conveyor, and circuit breaking means operable by a pallet on the said unloader conveyor.

References Cited in the file of this patent

UNITED STATES PATENTS

| | | |
|---|---|---|
| 1,407,124 | Carr | Feb. 21, 1922 |
| 1,560,720 | Olson | Nov. 10, 1925 |
| 1,858,619 | Delamere | May 17, 1932 |
| 1,912,898 | Jennings et al. | June 6, 1933 |
| 1,949,964 | Keller et al. | Mar. 6, 1934 |
| 2,560,131 | Sasgen et al. | July 10, 1951 |
| 2,626,040 | Lamb | Jan. 20, 1953 |

FOREIGN PATENTS

| | | |
|---|---|---|
| 993,040 | France | July 18, 1951 |